United States Patent
Antonov

(12) 
(10) Patent No.: US 6,468,176 B1
(45) Date of Patent: Oct. 22, 2002

(54) TRANSMISSION AND METHOD OF SHIFTING A TRANSMISSION

(75) Inventor: Roumen Antonov, Paris (FR)

(73) Assignee: Antonov Automotive Technologies B.V., Rotterdam (NL)

( * ) Notice: Subject to any disclaimer, the term of this patent is extended or adjusted under 35 U.S.C. 154(b) by 0 days.

(21) Appl. No.: 09/486,834

(22) PCT Filed: Sep. 3, 1998

(86) PCT No.: PCT/FR98/01883

§ 371 (c)(1),
(2), (4) Date: Mar. 2, 2000

(87) PCT Pub. No.: WO99/13247

PCT Pub. Date: Mar. 18, 1999

(30) Foreign Application Priority Data

Sep. 5, 1997 (FR) ............................................. 97 11095

(51) Int. Cl.[7] ............................................. F16H 61/02
(52) U.S. Cl. .................... 475/257; 475/262; 192/105 C
(58) Field of Search ................... 475/257, 258, 475/262, 266, 267, 118, 140; 192/91 R, 105 C

(56) References Cited

U.S. PATENT DOCUMENTS

| | | | |
|---|---|---|---|
| 4,450,735 A | * | 5/1984 | Koivunen et al. .......... 475/262 |
| 4,527,678 A | | 7/1985 | Pierce et al. |
| 5,509,860 A | * | 4/1996 | Legner ........................ 475/129 |
| 5,885,180 A | * | 3/1999 | Antonov ................. 475/258 X |
| 6,155,952 A | * | 12/2000 | Antonov ................. 475/258 X |

FOREIGN PATENT DOCUMENTS

| | | |
|---|---|---|
| GB | 2032024 | 4/1980 |
| GB | 2 251 041 | 6/1992 |
| WO | 92/07206 | 4/1992 |
| WO | 96/06293 | 2/1996 |
| WO | 96/23144 | 8/1996 |
| WO | 97/08478 | 3/1997 |

* cited by examiner

Primary Examiner—Charles A. Marmor
Assistant Examiner—Ankur Parekh
(74) Attorney, Agent, or Firm—Kenyon & Kenyon

(57) ABSTRACT

The invention concerns a method for adjusting the smooth engagement of a gear ratio shift wherein a planetary train (7) is engaged in direct gear by the action of centrifugal counter-weights (29) locking a clutch (18). The clutch release can be derived either from a hydraulic actuator (18) or from axial reactive forces of the ring helical toothing, reaction which is transmitted by an axial stop (B2). In order to prevent the clutch (18) from being suddenly locked by the action of the counter-weights (29) in particular when the torque to be transmitted quickly disappears, a control unit (453) detects the instantaneous ratio ($V_E/V_S$), and generates measured back pressure in the actuator (45) while the counter-weights (29) are locking the clutch (18). The invention is useful for adjusting the smooth engagement of gear ratio shifts.

32 Claims, 4 Drawing Sheets

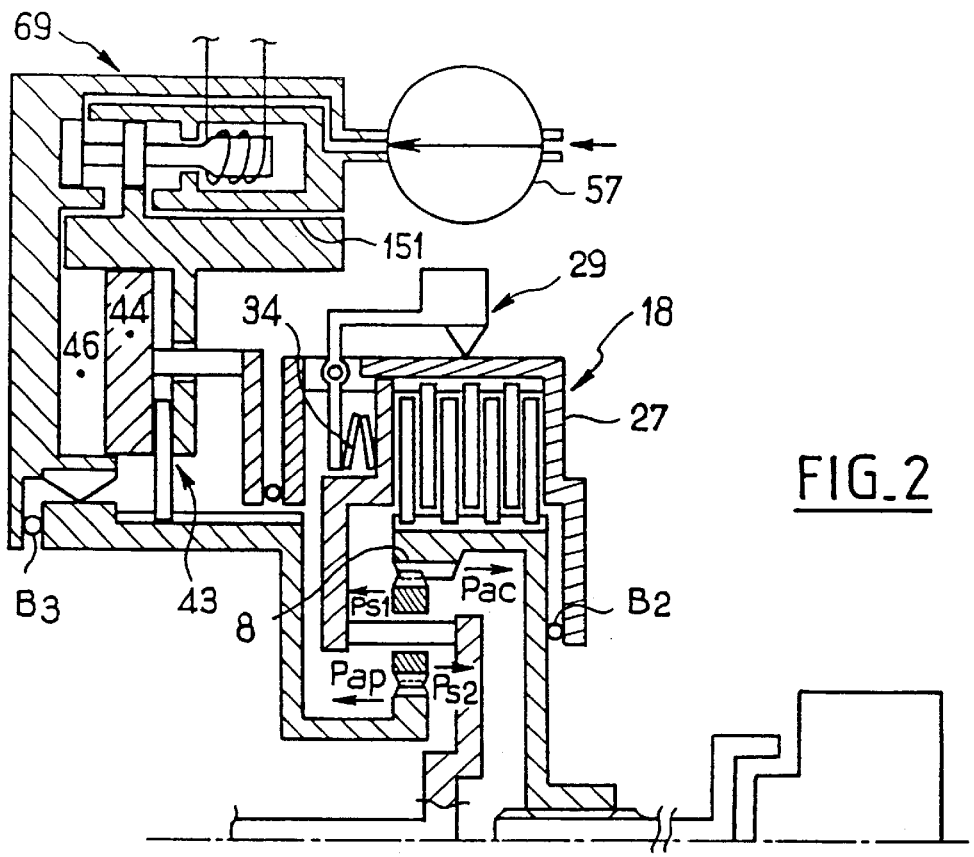
FIG_2
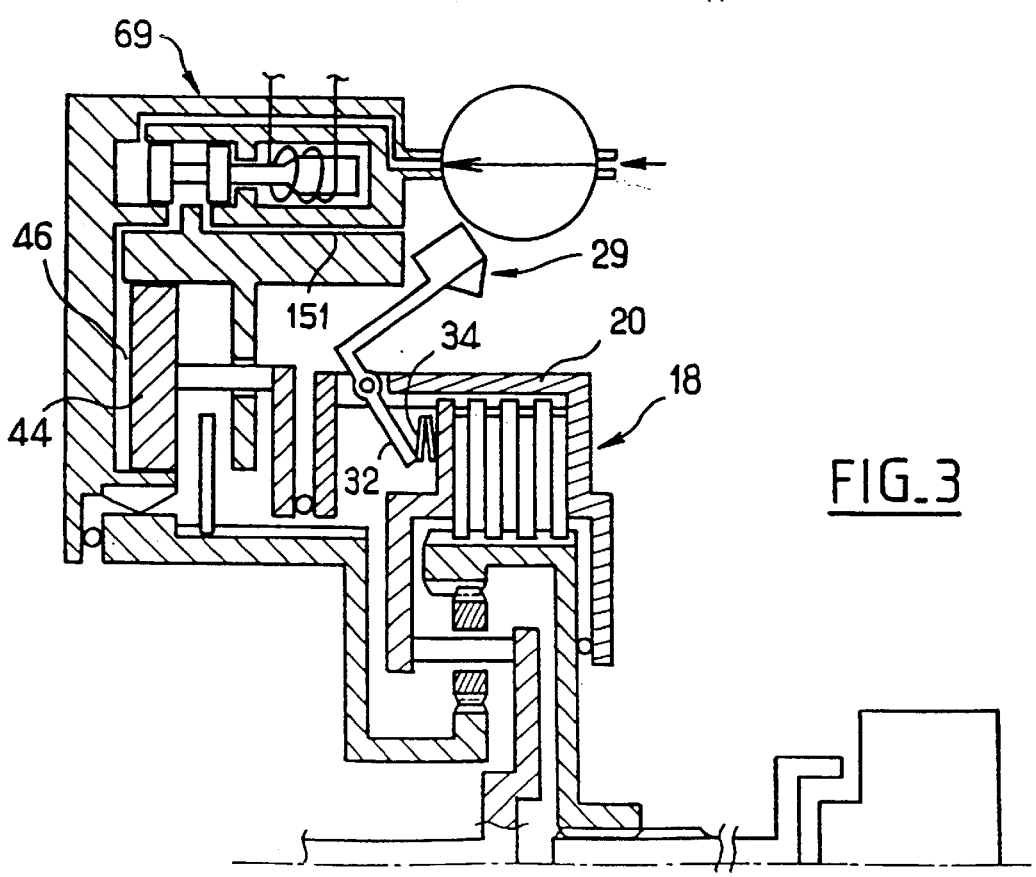
FIG_3

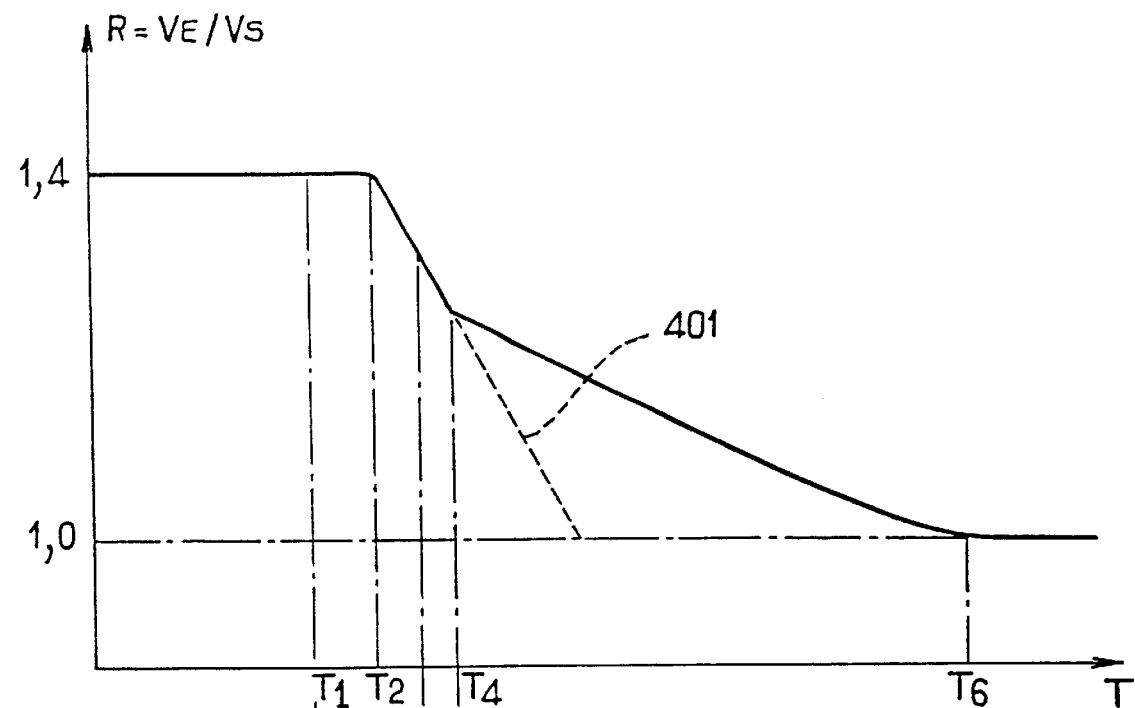
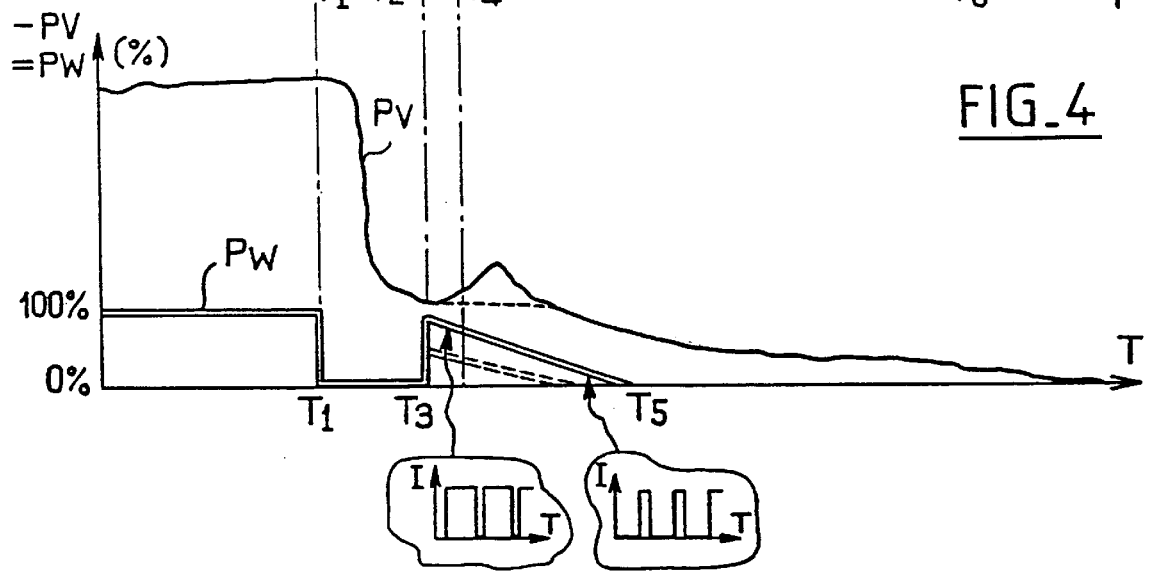
FIG_4
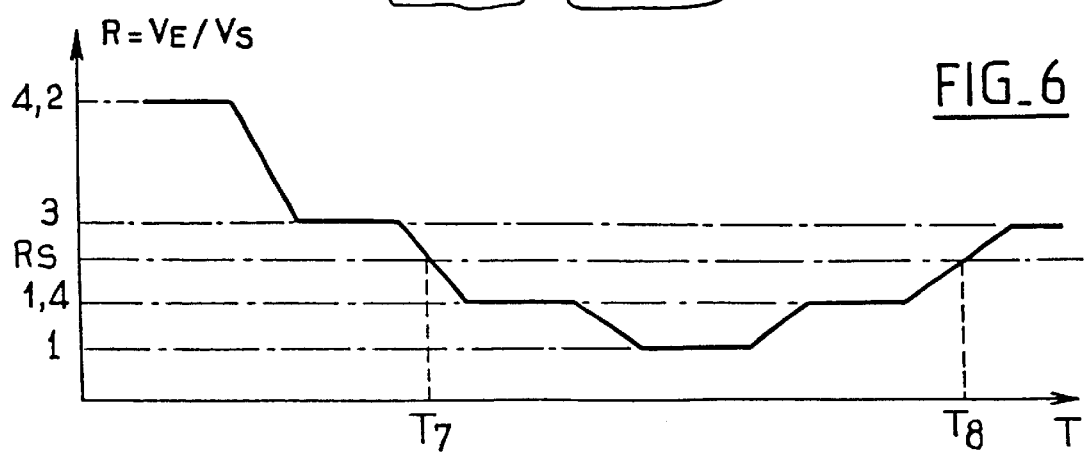
FIG_6

TRANSMISSION AND METHOD OF SHIFTING A TRANSMISSION

DESCRIPTION

This invention relates to a method for adjusting the shifting—or transmission ratio change—progressiveness in a transmission device, in particular in an automatic transmission device with multiple ratios.

This invention also relates to a transmission device implementing such a method.

From WO-A-9207206, there is already known an automatic transmission in which a clutch selectively connects two rotary members of a differential gearing such as an epicyclic train, according to whether one or the other of two antagonistic forces dominates. The first force, tending to disengage the clutch, is for example a tooth reaction, more particularly an axial thrust produced by helical gear teeth mounted in an axially movable manner. The second force, tending to engage the clutch, can be produced by springs and/or by tachometric centrifugal means. When the clutch is disengaged, it is necessary to prevent rotation of a third rotary member of the differential gearing, and this can be ensured by a free wheel preventing the third member from rotating in the reverse direction.

This type of transmission is very advantageous since its basic operation does not require an external power source, nor sensors, nor a control circuit. The transmission device itself does produce the forces which will control it and these forces are at the same time a measurement of the parameters necessary for the control.

For modern transmissions which have to provide a high level of comfort and optimisation of the operation, the previously mentioned forces are advantageously completed by additional forces, produced for example by hydraulic actuators. The additional forces can serve to modify at will the speed and torque conditions under which the transmission changes ratio, or can lock the transmission in a given ratio when that is desired (PCT/FR 94/00 176).

On the other hand, it has been observed, according to the invention, that the shifting process under the effect of forces such as a centrifugal force or a tooth reaction could exhibit certain defects.

WO-A-97/08 478 proposes solutions intended to remedy certain types of defects.

A particular defect to which the present invention is relevant, is the brutality which the action of an uncontrolled force generator, such as a spring or even more so a centrifugal force generator can have, particularly in the case of the above-mentioned transmissions, when the antagonistic force disappears and suddenly releases the force generator. For example, if the antagonistic force is proportional to the transmitted torque and the latter disappears because the driver releases the accelerator pedal, the uncontrolled force generator might suddenly actuate a clutch and cause a dangerous and uncomfortable shock.

The purpose of the present invention is to provide better control of a shifting process involving actuation of at least one selective coupling means.

According to the invention, the method for adjusting progressiveness of a change from an old transmission ratio to a new transmission ratio, in a transmission device comprising:

a device for selective coupling between two rotary members;

a force generator means for urging the selective coupling means towards a predetermined one of its slipping and gripping states, corresponding to the new ratio;

an actuating means capable of urging the selective coupling means towards the other of the said states, corresponding to the old ratio;

is characterised in that the method comprises, whilst the generator means is actuating the selective coupling means towards its state corresponding to the new ratio, a step of controlling the actuating means so that it produces a measured resistant force, slowing down the transition between the old ratio and the new ratio.

By means of the actuating means, the action of the force generator means is counter-balanced in a measured manner, systematically or only when necessary, in order to prevent the force generator means from provoking a too-sudden change in the selective coupling device.

The amount of the contrary force applied by the actuating means can either be a predetermined unique amount or an amount chosen from a series of predetermined amounts, the choice being made according to a selection criterion, for example the speed of rotation which determines the centrifugal effect if the force generator means is of the centrifugal type. Such a predetermined amount preferably consists of a progressively decreasing force, which therefore progressively allows the force generator means to urge the selective coupling means towards the new coupling state.

Preferably, a physical value is detected, this value being one which is influenced by the progressive change from the old transmission ratio to the new transmission ratio, and the actuating means is controlled as a function of the result of this detection.

In the case of a transmission in which the shiftings are carried out spontaneously, that is to say without the intervention of a processing unit and, for example, are carried out according to the direction and value of the resultant of various forces such as a centrifugal force and a tooth reaction force indicating the transmitted torque, the detection of the said physical value has the function of detecting that a change of ratio is in progress in the transmission. The counter-balancing action of the actuating means is initiated, at least in certain cases, according to this detection.

Furthermore, the detection of the physical value can be used to produce a servo-control of progressiveness. It is possible, for example, to calculate the time derivative of the transmission ratio and to adjust the counter-balancing action such that this derivative remains as close as possible to a reference value. It is possible to choose references other than the derivative. For example it is possible to fix a law of evolution of the ratio over time as a reference.

When the transmission offers a number of transmission ratios which is high in comparison with the number of gear trains used, there is in general at least one shifting process which requires activation of one coupling and the release of another coupling whilst perfectly synchronising these two operations. Any imperfection in this synchronisation renders the change of ratio uncomfortable for the occupants of the vehicle and introduces stresses and/or shocks, which cause wear, in the transmission.

The selective coupling means which initiates the shifting process can in such a case be the selective coupling means which is counter-balanced as just described and this selective coupling means can be the one whose actuation varies the input speed of the transmission device in the sense corresponding to the change of ratio to be effected. When the detected physical value reaches a certain predetermined level, the actuation of the other coupling means is initiated in its turn.

As physical value which is characteristic of the evolution of the ratio change process, it is indeed advantageous to choose the input speed, or the ratio between the input speed and the output speed of the transmission or, more generally, between two speeds the ratio between which is affected by the shifting process in question.

In such a case, a progressiveness control regulating the counter-balancing provided by the actuating means as a function of the evolution of the overall transmission ratio provided by the two transmission mechanisms will allow to compensate for all of the imperfections of the ratio change process in the two mechanisms. The overall result will therefore be very satisfactory despite the complexity of the shifting process which is involved.

Another advantage in choosing as a physical value one that indicates the state of the whole of the transmission device, and not just the state of a specified subassembly such as an epicyclic train in a transmission device which comprises several of them, and in particular in choosing as a physical value the ratio between the input speed and the output speed in the transmission, is that this value indicates, according to the range of values within which it is currently varying, which change of ratio is actually occurring. For example, in a device producing four transmission ratios with only two epicyclic mechanisms in series, there are three possible changes, i.e. from the first to the second ratio, from the third to the fourth ratio and from the third to the second ratio, which comprise the engagement of the same clutch. Because of the overall detection, it is possible to distinguish which of the changes is occurring and, if necessary, to modify the control criteria accordingly. Furthermore, the overall detection makes it possible to use a same detector assembly for all of the selective coupling means for which it is desired to apply the method according to the invention.

According to a second aspect of the invention, the transmission device for a vehicle, comprising:

at least one gear train;

a selective coupling means able, by changing from an old coupling state to a new coupling state, to cause the gear train to change from an old transmission ratio to a new transmission ratio;

a force generator means capable of causing the selective coupling means to change from the old coupling state to the new coupling state;

an actuating means capable of applying to the selective coupling means an action tending to force it towards the old coupling state;

control means for controlling the actuating means;

characterised in that the control means comprise progressiveness means for causing the actuating means to apply a measured amount of force slowing down the change of the selective coupling means from the old coupling state to the new coupling state under the action of the force generator means.

In the rest of this description, following convention, a transmission ratio will be called "slow" when it corresponds to a high input speed with respect to the output speed. In the opposite case, the ratio is called "fast".

Other features and advantages of the invention will furthermore emerge from the following description relating to non-limitative examples.

In the accompanying drawings:

FIGS. 2 and 3 are views similar to FIG. 1 but relating to operation as a reduction gear and as a direct drive respectively;

FIG. 4 is a time-based diagram showing a version of the method according to the invention;

FIGS. 6 and 7 are time-based diagrams illustrating the operation of the embodiment shown in FIG. 5.

Figure 1:
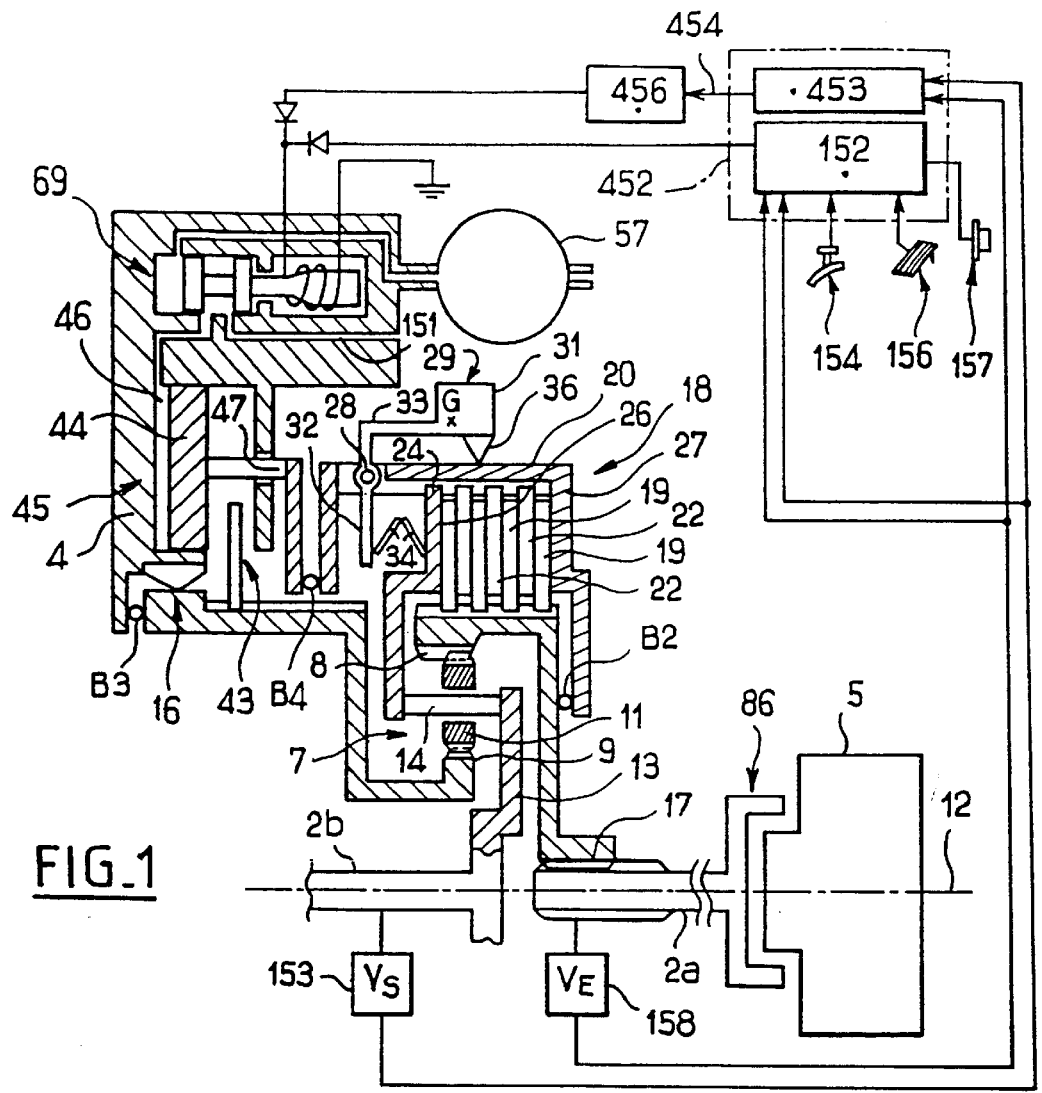
FIG. 1 is a diagrammatic half-view in longitudinal cross-section of a transmission device with two ratios according to the invention, in the rest state.

The transmission device with two ratios shown in FIG. 1, intended in particular for a motor vehicle, comprises an input shaft 2a and an output shaft 2b aligned along the axis 12 of the device. The input shaft 2a is connected to the output shaft of the engine 5 of a motor vehicle with the interposition of an input clutch 86 and possibly other means of transmission which are not shown. The output shaft 2b is intended to drive, directly or indirectly, the drive wheels of a vehicle. Between the output shaft 2b and the wheels of the vehicle there can, for example, be interposed another transmission device with two or more ratios and/or a manually controlled forward drive/reverse drive inverter and/or a differential for distributing the motion between the drive wheels of the vehicle.

The input 2a and output 2b shafts are axially immobilised with respect to a casing 4 of the transmission device, which is only partially shown.

The transmission device comprises a differential gearing formed by an epicyclic train 7. The train 7 comprises a crown with internal teeth and a sun wheel 9 with external teeth, both meshing with planets 11 supported, at equal angular intervals about the axis 12 of the transmission device, by off-centred trunnions 14 of a planet holder 13 rigidly connected to the output shaft 2b. The sun wheel 9 can rotate freely about the axis 12 of the transmission device with respect to the output shaft 2b which it surrounds. However, a free-wheel device 16 prevents the sun wheel 9 from rotating in reverse, that is to say in the opposite direction to the normal direction of rotation of the input shaft 2a with respect to the casing 4 of the transmission.

The crown wheel 8 is connected for common rotation with, but axially slidable with respect to the input shaft 2a, by the intermediary of splines 17.

A multi-disk clutch 18 selectively couples the crown wheel 8 with the planet holder 13.

The stack of disks 19 and 22 of the clutch 18 can be axially clamped between a retaining plate 26 integral with the planet holder 13 and a movable plate 27 which belongs to a cage 20, which is bound for common rotation with the planet holder 13, but slidable with respect to the latter.

The cage 20 supports centrifugal flyweights 29 disposed in a ring around the clutch 18. The flyweights are therefore bound for common rotation with the output shaft 2b of the transmission device.

The rotation of the planet holder 13 tends to cause a body 31 of each flyweight 29 to pivot radially outwardly about its tangential pivoting axis 28 under the effect of centrifugal force, in order to cause the flyweights to move from a rest position defined by abutment of a stop 36 of the flyweights against the cage 20 (FIGS. 1 and 2) and a separated position which can be seen in FIG. 3.

This results in a relative axial displacement between a nose 32 of each flyweight and the pivoting axis 28 of the flyweight. This displacement, which brings the nose 32 towards the movable plate 27, can correspond to a compression of a Belleville spring 34 fitted between the nose 32 and the retaining plate 26 and/or a displacement of the movable plate 27 towards the stationary plate 26 in the sense of clamping the clutch 18.

When the transmission device is in the rest state as shown in FIG. 1, the Belleville spring 34 transmits to the cage 20, by the intermediary of the flyweights abutted in the rest position, a force which engages the clutch 18 such that the input 2a of the transmission device is coupled in rotation with the output 2b and the transmission device constitutes a direct drive capable of transmitting torque up to a certain maximum defined by the clamping force of the Belleville spring.

Furthermore, the teeth of the crown wheel 8, of the planets 11 and of the sun wheel 9 are of the helical type. Thus, in each pair of gears meshing under load, axially opposed thrusts appear which are proportional to the transmitted circumferential force, and therefore to the torque on the input shaft 2a and to the torque on the output shaft 2b. The direction of helical inclination of the gear teeth is chosen such that the axial thrust Pac (FIG. 2) arising in the crown wheel 8 when it transmits a drive torque is applied in the direction in which the crown wheel 8 pushes the movable plate 27, by the intermediary of a thrust bearing B2, in the direction separating the plates 26 and 27, and therefore disengaging the clutch 18. The force Pac also tends to bring the nose 32 of the flyweights 29 and the retaining plate 26 towards one another, and therefore to maintain the flyweights 29 in their position of rest and to compress the Belleville spring 34. The planets 11, which mesh not only with the crown wheel 8 but also with the sun wheel 9 undergo two opposite axial reactions PS1 and PS2, which balance out, and the sun wheel 9 undergoes, taking account of its meshing with the planets 11, an axial thrust Pap which is equal in intensity and opposite to the axial thrust Pap of the crown wheel 8. The thrust Pap of the sun wheel 9 is transmitted to the casing 4 by the intermediary of a thrust bearing B3.

This is the situation shown in FIG. 2. Assuming that this position is achieved, the basic operation of the transmission device will now be described. As long as the torque transmitted by the input shaft 2a is such that the axial thrust Pac in the crown wheel 8 suffices to compress the Belleville spring 34 and to maintain the flyweights 29 in the rest position shown in FIG. 2, the separation between the retaining plate 26 and the movable plate 27 of the clutch is such that the disks 19 and 22 slip against each other without transmitting torque between them. In this case, the planet carrier 13 can rotate at a speed different from that of the input shaft 2a, and it tends to be immobilised by the load which the output shaft 2b must drive. The result of this is that the planets 11 tend to behave as motion reversers, that is to say to cause the sun wheel 9 to rotate in the opposite direction of rotation from the crown wheel 8. But this is prevented by the free wheel 16. The sun wheel 9 is therefore immobilised by the free wheel 16 and the planet carrier 13 rotates at a speed which is intermediate between the zero speed of the sun wheel 9 and the speed of the crown wheel 8 and of the input shaft 2a. The module therefore operates as a reduction gear. If the speed of rotation increases and the torque remains unchanged, a time arrives at which the centrifugal force of the flyweights 29 produces on the movable plate 27 with respect to the retaining plate 26 an axial clamping force which is greater than the axial thrust Pac, and the movable plate 27 is pushed towards the plate 26 in order to achieve direct drive (FIG. 3).

The clutch 18, as it is being engaged during the change to direct drive, increasingly transmits power directly from the crown wheel 8, bound to the input shaft 2a, to the planet carrier 13, bound to the output shaft 2b. Consequently, the teeth of the epicyclic train 7 work decreasingly, that is to say they transmit progressively decreasing force. The axial thrust Pac decreases and finally disappears. Thus, the axial thrust due to the centrifugal force can be applied fully in order to clamp the plates 26 and 27 against one another.

It can then happen that the speed of rotation of the output shaft 2b reduces, and/or that the torque to be transmitted increases, to such a point that the flyweights 29 no longer provide in the clutch 18 a sufficient clamping force to transmit the torque. In this case, the clutch 18 begins to slip. The speed of the sun wheel 9 reduces until it becomes zero. The free wheel 16 immobilises the sun wheel and the tooth force Pac reappears in order to disengage the clutch, such that the transmission device then operates as a reduction gear. Thus, each time that a change of operation from a reduction gear to operation in direct drive or vice-versa occurs, the axial force Pac varies in the sense which stabilises the newly instituted transmission ratio. This is very advantageous on the one hand to prevent too-frequent changes of ratio about certain critical operating points and, on the other hand, in order that the situations in which the clutch 18 is slipping are only transient.

As shown in FIG. 1, complementary means are provided to selectively cause operation of the transmission device as a reduction gear in conditions other than those determined 12 by the axial forces of the Belleville spring 34, the flyweights 29 and the teeth of the crown wheel 8.

For this purpose, the transmission device comprises a brake 43 which allows to immobilise the sun wheel 9 with respect to the casing 4 independently from the free wheel 16. In other words, the brake 43 is mounted operatively in parallel with the free wheel 16 between the sun wheel 9 and the casing 4. The piston 44 of a hydraulic actuator 43 is mounted in a axially sliding manner for selectively applying and releasing the brake 43. The brake 43 and the piston 44 have an annular shape having as their axis the axis 12 of the transmission device. The piston 44 is adjacent to a hydraulic chamber 46 which can be selectively fed with pressurised oil in order to drive the piston in the direction of applying the brake 43.

Furthermore, the piston 44 is rigidly connected to a push rod 47 which can press against the cage 20 by means of an axial thrust bearing B4. The assembly is such that when the pressure existing inside the chamber 46 pushes the piston 44 into the position of applying the brake 43, the cage 20, before the brake 43 is applied, is pushed back sufficiently for the clutch 18 to be released.

Thus, when the piston 44 is in the position of applying the brake (FIG. 2), the sun wheel 9 is immobilised even if the planet holder 13 is tending to rotate faster than the crown wheel 8, as is the case when operating in engine braking mode, and consequently the module operates as a reduction gear, as allowed by the release of the clutch 18.

The assembly 43, 44, 46, 47 which has just been described constitutes an actuating means which can be made available to the driver of the vehicle to force the module to change to operation as a reduction gear or to retain the operation as a reduction gear when the driver wishes to increase the engine braking effect, for example when going downhill, or when he wishes to increase the engine torque on the output shaft 2b. When the torque is a driving torque, the brake 43, if applied, carries out a redundant action with that of the free wheel 16, but this is not harmful.

The feeding and draining of the chamber 46 are determined by the state of an electro-valve 69. When it is in the rest state, the electro-valve 69 (FIGS. 1 and 3) connects the chamber 46 with a drain path 151 which is hydraulically resistant. When the electro-valve 69 is electrically energised (FIG. 2), it isolates the chamber 46 from the drain path 151 and connects it with the output of a pump 57 driven by the engine 5. Irrespective of the state of the electro-valve 69, the pump 57 can also serve to feed a lubrication circuit (not shown) of the transmission device.

The electro-valve 69 is controlled by control means 452 comprising a control unit 152 connected to a detector 153 of the speed $V_S$ of the output shaft 2b, a detector 158 of the speed $V_E$ of the input shaft 2a, a "manual/automatic" selector 154 made available to the driver, a detector of the position of the accelerator pedal 156 and a "normal/sport" selector 157 allowing the driver to choose between two different automatic behaviours of the transmission device.

The control unit 152 monitors the ratio between the input speed $V_E$ and the output speed $V_S$. As long as the device is operating as a reduction gear (the situation shown in FIG. 2), this ratio is equal to about 1.4. If the input speed $V_E$ reduces with respect to the output speed $V_S$, it is because the flyweights 29 have begun to engage the clutch 18 and consequently the transmission device has spontaneously initiated a change to direct drive operation. In this case, in order to ensure the progressiveness of this process and, more particularly, to ensure a certain duration of slipping of the disks 19 and 22 of the clutch, the control means 452 which have detected the reduction in $V_E$ with respect to $V_S$ control the feeding of the chamber 46 such that the piston 44 pushes the cage 20 in the direction tending to release the clutch 18, in order to slow down the engagement process resulting in the situation shown in FIG. 3. In practice, it is desired that the control means 452 cause as soon as possible the start of the action of the piston 44. Taking account of the detection delay and of the inevitable response times, the action begins when the ratio $V_E/V_S$ becomes lower than about 1.3.

In the example shown, the control means 452 comprise, in addition to the control unit 152, a progressiveness stage 453 which also receives the signals $V_E$ and $V_S$, continuously calculates the transmission ratio, detects the variation in the ratio $V_E/V_S$, resulting from the start of engagement of the clutch 18 and selectively produces on its output 454 a control signal producing a modulated energising of the electro-valve 69 such that the actuator 45 is fed as has just been described.

The method according to the invention will now be described more precisely with reference to FIG. 4.

In this figure, the uppermost graph shows the evolution of the transmission ratio $R=V_E/V_S$, (vertical axis) with respect to time T (horizontal axis). The lowermost graph shows, along the same time scale T, the energisation level (the double line on the drawing) of the winding of the electro-valve 69, and the pressure level PV (single line) in the chamber 46.

According to a preferred feature used in this example, the intensity of the counter-balance effect provided by the actuator 45 is controlled by the progressiveness unit 453 by varying the width PW of electrical pulses applied to the electro-valve 69. To do this, the signal on the output 454 is applied to a pulse generator 456 whose output 457 supplies the pulses to the electro-valve 69. The width PW of the pulses varies from 0% (total absence of pulses) to 100%, corresponding to continuous working. The lower graph in FIG. 4 shows the evolution of the width of the pulses with respect to time, expressed in %. Small detail views show that a high percentage corresponds to a large pulse width and a low percentage corresponds to a small pulse width.

The pulse repetition frequency is constant and can for example be 50 Hz. The amplitude of the pulses outside of the cut-off periods is also constant, 12 volts for example.

In the example shown, the transmission ratio is initially equal to 1.4. Until the time $T_1$ the operation as a reduction gear is imposed by the actuator 45 since the width of the pulses applied to the electro-valve 69 is 100%. In this case it is a continuous signal applied by the control unit 152. The actuator 45 is designed such that it is capable of overcoming the centrifugal force produced by the flyweights 29 even in the absence of tooth reaction force PAC for all speeds where this can be useful in practice. For example, if it is considered that the maximum speed $V_S$ for which it can in certain cases be necessary to impose operation as a reduction gear is 3,000 r.p.m., the force of the actuator 45 when the pulse width is continuously 100% is at least equal to the force produced by the centrifugal effect on the noses 32 of the flyweights when the cage 20 is rotating at 3,000 r.p.m.

Operation as a reduction gear continues for a certain time until the time $T_2$ at which the transmission ratio suddenly starts to decrease. The duration $T_1-T_2$ can be very short if, as from the end of feeding the actuator 45, the axial force produced by the flyweights 29 is greater than the reaction $P_{AC}$. The duration $T_1-T_2$ can be longer in the opposite case, and if it is necessary consequently to wait for the unbalance between the force produced by the flyweights 29 and the tooth reaction force $P_{AC}$ to begin to change direction. Whatever the case may be, the progressiveness unit 453, which continuously calculates the ratio $R=V_E/V_S$ detects slightly after the time $T_2$ that a change from operation as a reduction gear to operation as a direct drive has begun. The unit 453 thus causes, as from the time $T_3$ and up to the time $T_5$ a predetermined energising of the actuator 45 in order to slow down the process of change to direct drive, by counter-balancing in a measured manner the force produced by the flyweights 29.

Since the actuator 45 is capable of maintaining the clutch 18 disengaged against the effect of the flyweights 29 even in the absence of any tooth reaction $P_{AC}$, a durable energising of the actuator 45 at PW=100% would have the effect not of slowing down the change to direct drive, but in most case of preventing it totally and of causing a return to operation as a reduction gear.

In the example shown, the adjustment of the counter-balancing effect consists in applying to the electro-valve 69, as shown at the bottom of FIG. 4, a pulse width which varies from 100% to 0% linearly between the time $T_3$ and the time $T_5$. The time interval $T_3-T_5$ is in agreement with the duration desired for good progressiveness of the ratio change.

More particularly, the effect of the pulses is to produce a rise in the pressure PV in the chamber 46 of the actuator 45 up to a level which is however distinctly below that produced by a pulse width durably fixed at 100% (see the graph at the bottom of FIG. 4). Under the effect of the pulses, the electro-valve 69 oscillates between the open state and the closed state. When it connects the chamber 46 with the pump 57, a pressure wave is sent into the chamber 46. When the electro-valve 69 connects the chamber 46 with the drain channel 151, the hydraulically resistant nature of this channel prevents an immediate discharge of the chamber 46. This results in a counter-balancing force on the piston 44, this force being modulated substantially according to the profile of pulse widths PW over time T, but with a certain delay. Consequently, the resultant force applied to the clutch in the sense of engagement thereof increases from a very small value at the time $T_2$ to a value equal to the force produced by the flyweights when, a certain time after the end of the pulses at the time T5, the pressure in the chamber 46 is eliminated. Thus, the transmission ratio, instead of suddenly dropping along the dotted line 401 shown in FIG. 4, decreases progressively from the time $T_4$ (slightly after the time $T_3$), to the time $T_6$, after the time $T_5$ of the end of the pulses. The profile of the decrease in ratio can vary greatly from one case to another, depending for example on whether the change of ratio is due to an increase, necessarily progressive, in the speed of rotation $V_S$, or to a disappearance, which can be sudden, of the torque to be transmitted. Typically, as shown in FIG. 4, the decrease profile resembles the decrease profile of the pulse width PW.

Improved progressiveness can also be provided when the control means 452, as a function of the signals they receive on their inputs, must control shifting from direct drive operation to reduction gear operation, by means of the actuator 45.

To do this, instead of suddenly changing the width of the pulses PW to be applied to the electro-valve 69 from 0% to 100%, the electro-valve can be subjected to a progressive increase in the width PW of the pulses which are applied to it. It can however be advantageous to begin with a few pulses of large width in order to fill the chamber 46 rapidly and to rapidly take up the various plays and possible deformations of the system. After that, the pulses drop down to a smaller width and then increase again up to a durable level of 100%.

Finally, according to a variant shown in dotted line in the lowermost graph of FIG. 4, it is possible for the train of pulses applied to the electro-valve 69 in order to slow down the change to direct drive to start from a value of PW below 100%, the influence on the pressure in the chamber 46 being correspondingly reduced.

Figure 5:
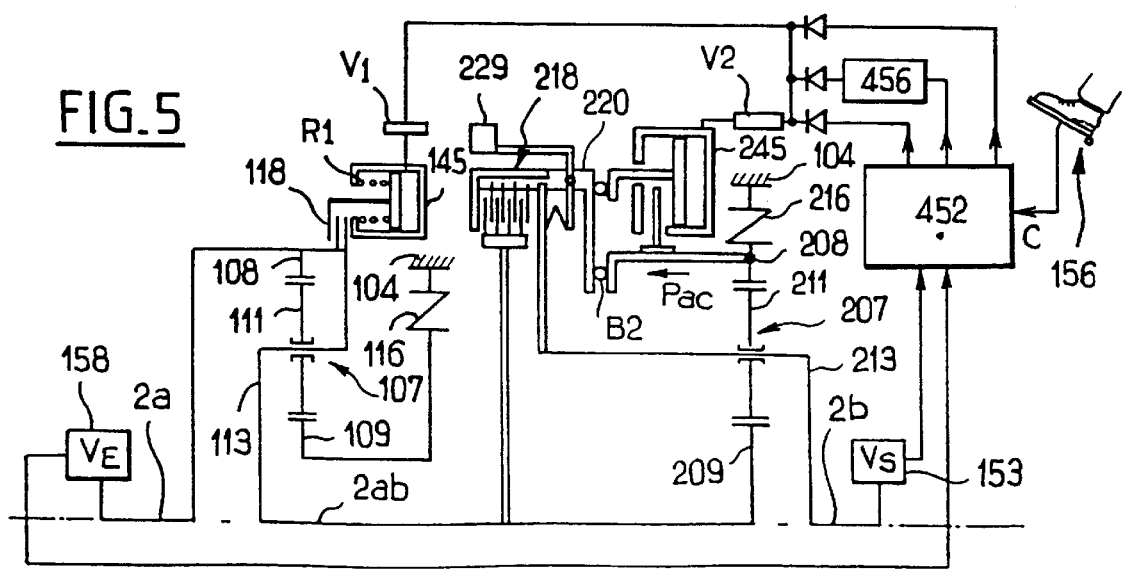
FIG. 5 is as diagrammatic half-view of a transmission device with four ratios according to the invention.

In the embodiment diagrammatically shown in FIG. 5, the transmission device comprises two planetary trains fitted in series, 107, 207. The planetary train 107 is similar to the one described with reference to FIGS. 1 to 3: its crown wheel 108 is connected to the input shaft 2a, its sun wheel 109 is connected to the casing 104 by the intermediary of a free wheel 116, and its planet holder 114, supporting planets 111 meshing with the crown wheel 108 and the sun wheel 109, is connected to the output shaft 2ab of the mechanism 107, which is also the input shaft of the mechanism 207. A clutch 118 makes it possible to couple selectively the crown wheel 108 with the planet holder 114, in other words the input shaft 2a with the intermediate shaft 2ab in order to achieve direct drive in the planetary train 107. When the clutch 118 is released, the planetary train 107 operates as a reduction gear, the sun wheel then being immobilised by the free wheel 116. The reduction ratio provided by such a planetary train, that is to say a planetary train with an input on the crown wheel and an output on the planet holder, is commonly of the order of 1.4.

The second planetary train 207 is different in that its input shaft, constituted by the intermediate shaft 2ab, is connected not to the crown wheel 208, but to the sun wheel 209, the crown wheel 208 being connected to the casing 104 by the intermediary of a free wheel 216 preventing the crown wheel 208 from rotating in the reverse direction. The output shaft 2b is connected to the planet holder 214 supporting planets 211 each meshing with the crown wheel 208 and the sun wheel 209. A clutch 218 allows to firmly connect the intermediate shaft 2ab with the output shaft 2b in order to achieve a direct drive in the second differential mechanism 207.

When the clutch 218 is disengaged, the mechanism 207 operates as a reduction gear with the crown wheel 208 immobilised by the free wheel 216. Taking account of the fact that the input is applied through the sun wheel 209 and the output is taken from the planet holder 214, the reduction ratio is therefore typically equal to 3.

The clutches 118 and 218 are selectively engaged by a spring R1 and respectively by the flyweights 229 driven in rotation by the planet holder 213, and disengaged against the action of the spring R1 and respectively of the flyweights 229, by actuators A1 and A2 respectively, each controlled by an electro-valve V1 and V2 respectively, which are themselves controlled by the control unit 452. Furthermore, in the case of the clutch 218, a thrust bearing B2 transmits the axial tooth force $P_{AC}$ from the crown wheel 208 to the cage 220 in the sense of disengaging the clutch 218.

The unit 452 receives on its inputs the signals $V_E$ and $V_S$ supplied by the detectors 158 and 153 respectively as well as the signal from the detector 156 indicating the position of the vehicle's accelerator pedal, which corresponds to a load parameter C of the vehicle's engine, which can be expressed for example as a percentage of the maximum load.

The transmission device which has just been described is capable of providing four different ratios. The first ratio, or slowest ratio, is established when the two clutches 118, 218 are disengaged and consequently the two planetary trains 107, 207 are operating as reduction gears. The transmission therefore provides a reduction ratio equal to 1.4×3=4.2.

For operation in the second ratio, the clutch 118 is engaged and the clutch 218 is disengaged, such that the planetary train 107 operates as a direct drive and the planetary train 207 as a reduction gear, which gives a total reduction ratio of 3 in the transmission device.

For operation in the third ratio, the opposite case applies, the clutch 118 is disengaged and the clutch 218 is engaged, such that only the first planetary train 107 is operating as a reduction gear. This provides an overall reduction ratio equal to 1.4.

For operating in the fourth ratio, or the fastest ratio, the two trains 107, 207 operate as direct drives, the overall ratio being equal to 1.

In the simple example which is illustrated, the changes of ratio in the first train are only controlled by the unit 452 according to the functional parameters $V_S$ (output speed) and C (load) but more sophisticated versions are conceivable, the first train for example then being similar to that of FIGS. 1 to 3.

In this transmission device, the change from the second to the third ratio is difficult to control because the clutch 118 must be disengaged at the time the clutch 218 must be engaged. If the synchronisation between these two operations is imperfect, there is a risk of having, for a short time, either a simultaneous disengagement of the two clutches, that is to say a brief return to the first transmission ratio probably with a risk of excess speed of the engine, or a simultaneous engagement of the two clutches, that is to say a brief situation of direct drive in the whole of the transmission with a risk of inadequate speed of the engine. In both cases, the passengers suffer shocks and the mechanics suffer shocks and useless stresses. Furthermore, these functional irregularities, if they were allowed to occur, would react on the functional parameters sensed by the unit 452, and this would disturb the shifting process even more.

It can be seen from FIG. 6 that the detection by the unit 452 of the overall ratio of the transmission device $R=V_E/V_S$ allows the control unit to know what transmission ratio is being produced at any time and, consequently, upon variation of that ratio, what ratio change is in progress.

Consequently, when starting from the second transmission ratio, corresponding to R=3, the flyweights 229 of the second epicylic train 207 begin to engage the clutch 218, the unit 452 detects that it is a change from the second ratio to the third ratio, a change for which it will be necessary to synchronise the action of the two clutches.

Figure 7:
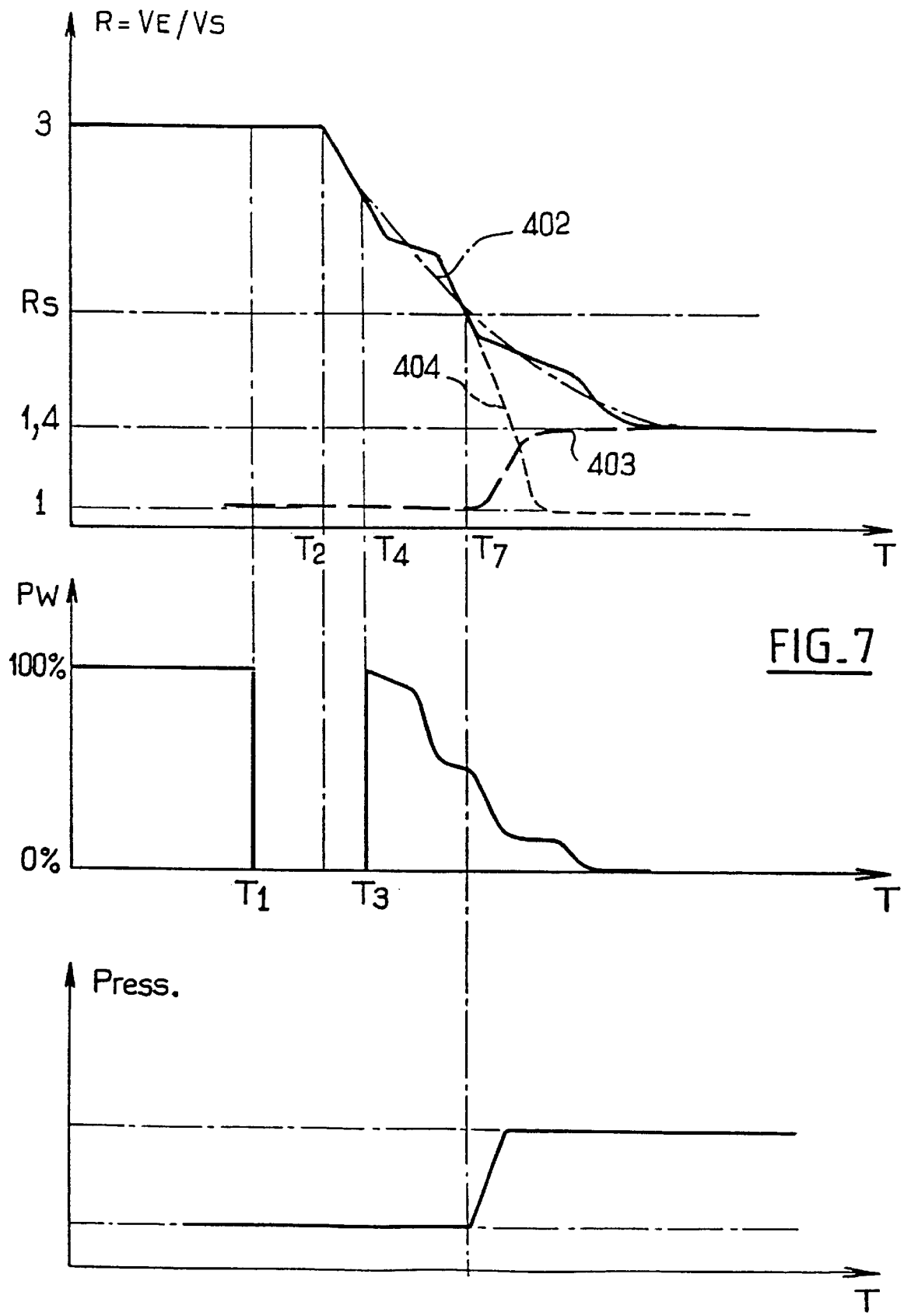

FIG. 7 illustrates the process which is used to avoid the above-mentioned disadvantages, and more generally to produce a virtually perfect transition between the second and the third transmission ratios.

In the example of FIG. 7 there is again found the time T1 starting from which the control unit 452 authorises the engagement of the second clutch 218, the time T2 starting from which this engagement begins to happen, and the time T3 starting from which the control unit 452, in this example integrating the progressiveness unit, excites the actuator 245 in a measured manner to prevent a too-rapid engagement of this clutch. The train of pulses is also applied to the actuator 145, which application advantageously initiates disengagement of the clutch 118.

In this example, more perfected than the one shown in FIG. 4, the control unit 152 continuously calculates the ratio R and adapts the excitation (width of pulses) of the actuator 245 such that R varies according to a law defined with respect to time, which has been previously loaded into a memory of the unit 452. In FIG. 7, this predetermined law is illustrated by a curve shown in dotted and dashed line 402. Several types of servo-control are possible. For example it is possible at each instant to calculate the error between the value of R and a command value at that instant. It is also possible at each instant to calculate the time derivative of R and to correct the excitation of the actuator 245 to attempt to bring this derivative back to a predetermined command value.

At an instant T7, the unit 452 detects that R has passed through a threshold $R_S$, for example $R_S$=2. At that instant, the unit 452 commands continuous excitation, at PW=100%, of the actuator 145 in order to disengage the clutch 118 of the first train 107. The hydraulic pressure in the actuator 145 is illustrated by the diagram at the bottom of FIG. 7. Consequently, the train 107 progressively changes from operation in direct drive to operation as a reduction gear, as illustrated by the diagram 403 at the top of FIG. 7, its transmission ratio therefore changes from 1.0 to 1.4. Even if the coming into action of the actuator 145 is relatively sudden, this does not produce any shock on the input shaft 2a or on the output shaft 2b since the regulation provided by the actuator 245 affects the overall ratio of the transmission. Consequently, as illustrated by the curve 404 at the top of FIG. 7, if the coming into action of the actuator 145 is sudden, the regulation carried out by the actuator 245 will cause a corresponding sudden decrease of the transmission ratio in the train 207, such that the overall ratio continues to follow the ideal profile 402 quite closely.

Returning to FIG. 6, when the unit 452 detects a change from the first to the second ratio or from the third to the fourth ratio, for each of which there is an engagement of the clutch 118 without modification of the state of the clutch 218, the actuator 145 can be controlled as described with reference to FIGS. 1 to 4 or in a more sophisticated manner such that the transmission ratio or its time derivative follows a predetermined law or command. The pulses, also applied to the clutch 218 have no effect on the latter since the resulting pressure in the actuator 245 is insufficient.

In the right hand section of FIG. 6 there has also been illustrated the situations in which the transmission device causes a change to a slower ratio. In this case, the actuators can be controlled as described in WO-97/08 478, whose content is integrated in the present application by way of reference.

With regard to the change from the third to the second ratio (the right hand section of FIG. 6), the latter is initiated spontaneously by a slipping of the clutch 218 or on the intervention of the unit 452 provoking this slipping by an appropriate excitation of the actuator 245. Starting from a time T8 corresponding to the passing of a threshold which can be the threshold $R_S$ as illustrated or a slightly different threshold, the unit 452 begins draining the actuator 145. In this case, the method according to the invention can also be used, by maintaining, by means of width-modulated pulses, a measured resistance in the actuator 145 against the action of the spring R1.

The invention is not of course limited to the examplary embodiments described and shown.

The use of the invention is not necessarily coupled with other control functions of a transmission.

The invention is compatible with transmissions other than those actuated by centrifugal force and/or tooth reaction forces.

In an embodiment where it is necessary to modify simultaneously the state of two clutches such as 118 and 218 in FIG. 5, the invention could be applied only to the clutch which is subjected to the action of the force generator, for example such as described with reference to FIGS. 1 to 4, and the progressiveness of the change of state of the other clutch could be regulated in another way, by using, in particular, the disclosures of WO-A-96/23 144 and of WO-A-97/08 478.

What is claimed is:

1. A method of adjusting progressiveness of a change from an old transmission ratio to a new transmission ratio, in a transmission device comprising:
   a device for selective coupling between two rotary members;
   a force generator means for urging the selective coupling means towards a predetermined one of its slipping and gripping states, corresponding to the new ratio;
   an actuating means capable of urging the selective coupling means towards the other of the said states, corresponding to the old ratio;
   wherein the method comprises, starting from a condition in which said coupling means is in said other state whilst being urged by said force generator means towards said predetermined state, letting said coupling means being actuated into said predetermined state by said force generator means whilst maintaining unaltered operating conditions of said force generator means, and controlling the actuating means so that said actuating means produces an actively modulated resistant force, slowing down the transition between the old ratio and the new ratio.

2. A method according to claim 1, characterized in that it is applied to a transmission device whose actuating means is a hydraulic actuator (45, 145, 245), and in that the control step is performed by selectively connecting a pressure chamber (46) of the actuator with a pressure source (57).

3. A method according to claim 2, characterized in that the said resistant force is adjusted by alternating phases in which the pressure chamber (46) is connected with a drain circuit (151) and phases during which the pressure chamber is connected with the source (57).

4. A method according to claim 1, characterised in that the actuator is excited by means of pulses.

5. A method according to claim 4, characterized in that the force is adjusted by regulating the width of the pulses (PW).

6. A method according to claim 1, characterized in that there is applied to the actuating means (45, 145, 245) an excitation which decreases from a maximum and according to a predetermined decreasing profile.

7. A method according to claim 6, characterized in that there is detected a physical value ($V_E$, $V_S$) which is affected by the progressive change from the old transmission ratio to the new transmission ratio, and in that the actuating means (45, 245) is controlled as a function of the result of this detection.

8. A method according to claim 7, characterized in that there is detected as a physical value at least one speed of rotation ($V_E$) and in that it is compared with another speed of rotation ($V_S$) with respect to which it varies during the ratio change process.

9. A method according to claim 8, characterized in that the resistant force is adjusted according to the difference between a real value obtained by the detection of the physical value and a command value during ratio change process.

10. A method according to claim 9, characterized in that, furthermore, another change of state in the transmission device is controlled according to the detected physical value.

11. A method according to claim 10, characterized in that the control of the other change of state comprises the initiation of the said other change of state when the physical value has passed through a predetermined threshold ($R_S$).

12. A method according to claim 10, characterized by determining if the said other change of state is necessary according to the range of values within which the physical value (R) evolves during the change of ratio.

13. A method according to claim 7, characterized, in that there is detected, as a physical value, an input speed ($V_E$) of the transmission device in comparison with an output speed ($V_S$) of the transmission device.

14. A method according to claim 1, characterized in that it is applied to a transmission device in which the force generator means is of the centrifugal type.

15. A method according to claim 1, characterized in that the actuating means acts in the same sense on the selective coupling device as a force ($P_{AC}$) produced in proportion with a torque transmitted in the transmission device.

16. A transmission device for a vehicle, comprising:
   at least one gear train;
   a selective coupling means able, by changing from an old coupling state to a new coupling state, to cause the gear train to change from an old transmission ratio to a new transmission ratio;
   a force generator means capable of causing the selective coupling means to change from the old coupling state to the new coupling state;
   an actuating means capable of applying to the selective coupling means an action tending to force it towards the old coupling state;
   control means for controlling the actuating means; wherein the control means comprise progressiveness means for causing regulated energization of the actuating means to apply a measured amount of force slowing down the change of the selective coupling means from the old coupling state to the new coupling state under an uncontrolled action of the force generator means.

17. A transmission device according to claim 16, characterized in that the actuator means is a hydraulic actuator, and in that the progressiveness means are designed to alternate phases of draining and phases of pressurizing a working chamber of the actuator.

18. A transmission device according to claim 17, characterized in that a drain path of the actuator is designed for providing a substantial resistance to drain flow.

19. A transmission device according to claim 16, characterized in that the progressiveness means are designed to generate pulses applied at least indirectly to the actuating means.

20. A transmission device according to claim 19, characterized in that the pulses have a variable pulse width.

21. A transmission device according to claim 19, characterized in that the progressiveness means are capable of selectively applying in a continuous manner pulses of a constant pulse width less than 100% in order to cause the actuator to produce a force which offsets spontaneous change of transmission ratio conditions in the transmission device.

22. A transmission device according to claim 16, characterized in that the control means have an input connected to a means for detecting a physical value capable of being affected by the progressive change in the transmission ratio after its initiation.

23. A transmission device according to claim 22, characterized in that the control means are responsive to evolution of the magnitude of said physical value in order to adjust action of the actuating means during the change from the old ratio to the new ratio.

24. A transmission device according to claim 22, characterized in that the physical value to which the control means are responsive comprises an input speed of the device ($V_E$) in comparison with an output speed of the device ($V_S$).

25. A transmission device according to claims 22, characterized in that the control means carry out a servo-control of the variation of the physical value with respect to a command.

26. A transmission device according to, claim 22, characterized in that the control means are responsive to evolution of the physical value in order to initiate a programmed, at least indirect, energization of the actuator means.

27. A transmission device according to claim 22, characterized in that the control means are furthermore responsive to a threshold value ($R_S$) of the physical value in order to initiate another change of state in the transmission device.

28. A transmission device according to claim 27, characterized in that it comprises two gear trains fitted in series, in that the coupling device is associated with a first of the gear trains in which the jump between the old ratio and the new ratio is relatively large, and in that the other change of state relates to the other gear train in order to change the ratio in the other direction with a smaller jump.

29. A transmission device according to claim 16, characterized in that the force generator means is a centrifugal means.

30. A transmission device according to claim 16, characterized in that the actuating means is fitted in such a way as to add its action to the selective coupling means in the same sense as an auto-control means producing a force ($P_{AC}$) representative of a torque transmitted in the transmission device.

31. A transmission device according to claim 30, characterized in that the auto-control means is a means of transmitting to the selective coupling means a tooth reaction force ($P_{AC}$) in the gear train.

32. A transmission device according to claim 29, characterized in that the old coupling state is an uncoupled state in which a rotational torque is transmitted by the gear train and the new coupling state is a state of engagement in which, in terms of torque transmission, the gear train is short-circuited by the selective coupling device.

* * * * *